(12) United States Patent
Shepherd

(10) Patent No.: US 10,683,033 B2
(45) Date of Patent: *Jun. 16, 2020

(54) MEMBER FOR CENTERING AND/OR STEERING ASSIST

(71) Applicant: John D Shepherd, Homer Glen, IL (US)

(72) Inventor: John D Shepherd, Homer Glen, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/003,971

(22) Filed: Jun. 8, 2018

(65) Prior Publication Data

US 2019/0210646 A1    Jul. 11, 2019

Related U.S. Application Data

(63) Continuation-in-part of application No. 15/659,294, filed on Jul. 25, 2017, now Pat. No. 10,328,971.

(Continued)

(51) Int. Cl.
*B62D 9/00* (2006.01)
*B62D 7/22* (2006.01)
(Continued)

(52) U.S. Cl.
CPC ............ *B62D 7/228* (2013.01); *B62D 12/02* (2013.01); *F16F 1/041* (2013.01); *F16F 1/12* (2013.01); *F16F 9/0218* (2013.01); *F16F 15/0232* (2013.01); *B62D 7/163* (2013.01); *B62D 7/18* (2013.01); *F16F 3/04* (2013.01); *F16F 9/0209* (2013.01); *F16F 9/0245* (2013.01); *F16F 9/54* (2013.01)

(58) Field of Classification Search
CPC .... B60G 11/14; B60G 11/27; B60G 2202/12; B60G 2202/152; B60G 2204/44; B60G 2206/42; B60G 2500/20; B60G 2500/30; B60G 2800/80; F16F 1/12; F16F 9/0209; F16F 15/0232; F16F 15/04
USPC ................ 280/89.11, 89.12, 93.51; 267/150
See application file for complete search history.

(56) References Cited

U.S. PATENT DOCUMENTS 1,745,117 A    1/1930    Plank
2,588,682 A  * 3/1952    Wyeth .................... B60G 13/04
                                                          267/134

(Continued)

OTHER PUBLICATIONS

Shepherd, John, International Search Report and Written Opinion issued by the International Searching Authority for corresponding PCT Application No. PCT/US2018/036694, dated Aug. 24, 2018.

*Primary Examiner* — Toan C To
(74) *Attorney, Agent, or Firm* — Greer Burns & Crain, Ltd.

(57) ABSTRACT

A centering member including a first section configured and arranged to produce a pulling force along a longitudinal axis thereof and a second section configured and arranged to produce a pushing force along a longitudinal axis thereof, wherein the first section and the second section are configured and arranged such that the longitudinal axis of the first section is aligned with the longitudinal axis of the second section. There is a first mounting means attached to a first distal end of the centering stabilizer and a second mounting means attached to a second distal end of the centering stabilizer Preferably, the first section comprises a gas push-type spring and the second section comprises a gas traction spring.

30 Claims, 15 Drawing Sheets

Related U.S. Application Data

(60) Provisional application No. 62/517,494, filed on Jun. 9, 2017.

(51) Int. Cl.

| | | |
|---|---|---|
| *F16F 15/023* | (2006.01) | |
| *F16F 1/12* | (2006.01) | |
| *B62D 12/02* | (2006.01) | |
| *F16F 1/04* | (2006.01) | |
| *F16F 9/02* | (2006.01) | |
| F16F 3/04 | (2006.01) | |
| B62D 7/16 | (2006.01) | |
| B62D 7/18 | (2006.01) | |
| F16F 9/54 | (2006.01) | |

(56) References Cited

U.S. PATENT DOCUMENTS

| | | | |
|---|---|---|---|
| 4,359,123 A | 11/1982 | Haupt et al. | |
| 4,406,473 A | 9/1983 | Sexton | |
| 4,736,931 A * | 4/1988 | Christopherson | B60G 15/063 188/322.19 |
| 4,822,012 A | 4/1989 | Sketo | |
| 4,925,165 A * | 5/1990 | Sketo | B62D 7/22 267/150 |
| 5,220,706 A * | 6/1993 | Bivens | E05F 3/02 16/66 |
| 5,364,114 A | 11/1994 | Petersen | |
| 5,620,194 A | 4/1997 | Keeler et al. | |
| 5,896,959 A | 4/1999 | Jeffries et al. | |
| 6,123,154 A | 10/2000 | Shepherd | |
| 6,126,154 A | 10/2000 | Shepherd | |
| 6,237,904 B1 | 5/2001 | Shepherd | |
| 6,530,585 B1 | 3/2003 | Howard | |
| 6,609,766 B1 | 8/2003 | Chesnut | |
| 6,698,777 B1 | 3/2004 | Shepherd | |
| 6,773,002 B2 | 8/2004 | Adoline et al. | |
| 6,817,620 B1 | 11/2004 | Howard | |
| 7,066,455 B2 | 6/2006 | Adoline et al. | |
| 7,207,579 B1 | 4/2007 | Howard | |
| 7,207,580 B2 | 4/2007 | Howard | |
| 7,401,677 B2 | 7/2008 | Boyle et al. | |
| 8,141,667 B2 | 3/2012 | Shepard, Jr. et al. | |
| 8,459,400 B2 | 6/2013 | Dillard | |
| 8,540,257 B1 | 9/2013 | Merchant et al. | |
| 8,733,771 B2 | 5/2014 | Johnson et al. | |
| 10,099,530 B2 | 10/2018 | Grimes | |
| 10,328,971 B1 * | 6/2019 | Shepherd | B62D 7/228 |
| 2002/0140197 A1 | 3/2002 | Howard | |
| 2004/0188968 A1 | 9/2004 | Warner | |
| 2012/0091678 A1 | 4/2012 | Buttner et al. | |

* cited by examiner

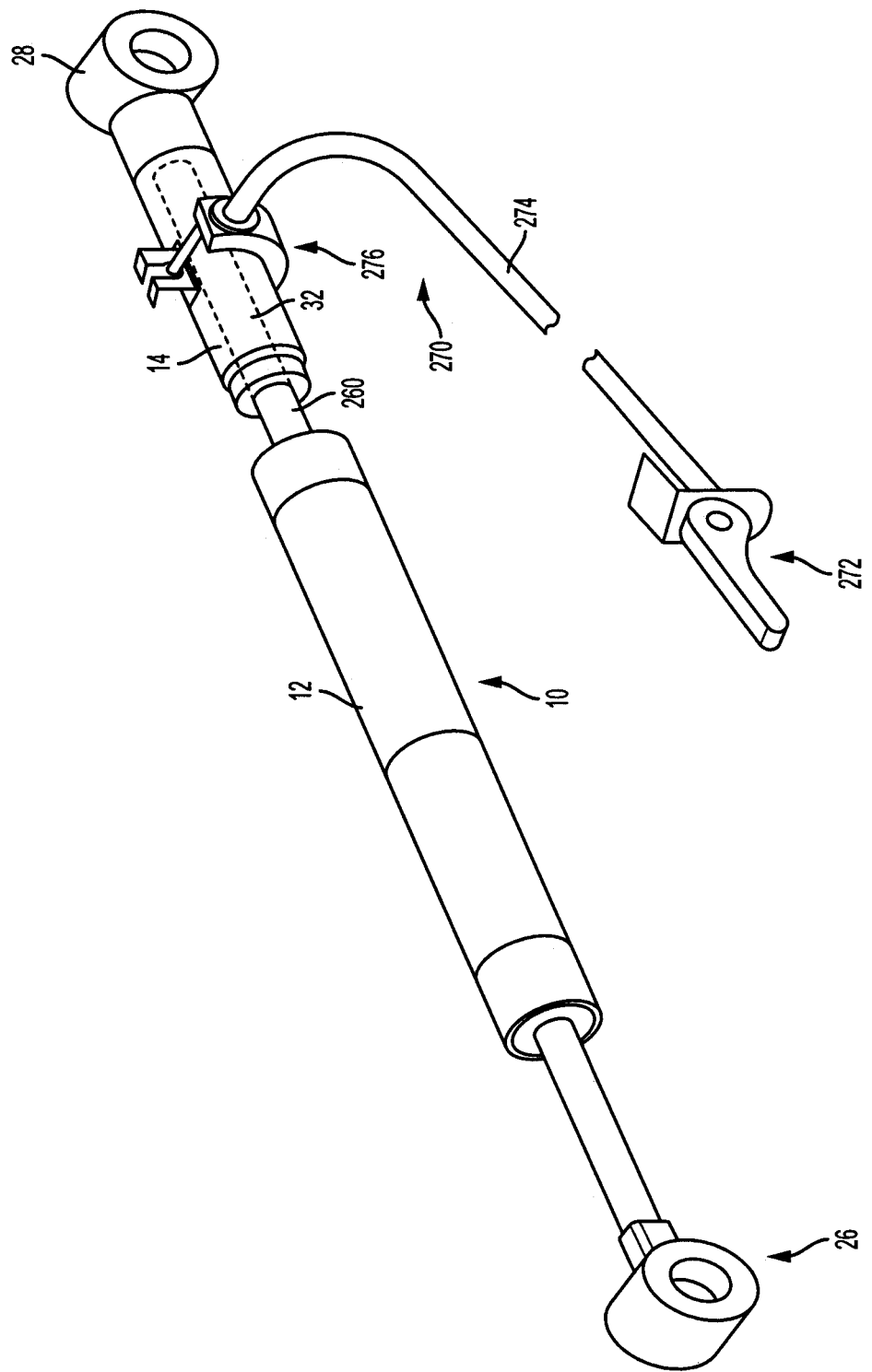

MEMBER FOR CENTERING AND/OR STEERING ASSIST

The present application is a Continuation-in-Part of U.S. patent application Ser. No. 15/659,294, filed on Jul. 25, 2017, which claims the benefit of United States Provisional Application Ser. No. 62/517,494, filed on Jun. 9, 2017.

The present invention relates generally to devices, systems and methods that provide a centering force, or a steering assist force, to a steering system of a vehicle, and more particularly to devices, systems and methods that involve devices that combine a component that creates a pushing force with a component that creates a pulling force, in certain embodiments, or with devices that create a return-to-center force with even a slight displacement from the center.

The present invention also relates to gas spring devices that incorporate a pull-type gas spring (also referred to as a traction gas spring) and a push-type gas spring into a single unit. Such devices could be used as part of the steering system of a vehicle. Alternatively, such devices could also be used in other applications not related to vehicle steering systems, such as with two-way doors, gates, hatches, etc.

BACKGROUND OF THE INVENTION

Steering assist members, also referred to as steering stabilizers, are known components of the steering system of a vehicle. Such members enable the steering system to counteract various interferences encountered when driving, such as potholes, uneven pavement, off-road obstacles, a blown tire, sudden wind gusts, etc., which would otherwise force the vehicle to deviate from the driver's desired straight-ahead trajectory. The steering assist member is intended to correct the steering of the vehicle under such circumstances by providing a force that returns the steering system to the driver's desired path, such as along a straight-away, by providing a return-to-center force.

Some prior art units only provide damping, and lack the desired additional force provided by return-to-center units. However, many of the available return-to-center units only provide very low forces near the center position, with ramped-up forces only being applied during bigger turns. Thus, smaller interferences are not corrected for by such units.

Accordingly, there is a need for a device that can provide return-to-center features with essentially any move off center. In other words, it would be desirable to have a unit that provides full pressure, or nearly full pressure, with even slight movements off center, or to have a unit that at least provides sufficient return to center force at slight deviations of the relevant portions of the steering assembly (such as deviations of less than 2 mm).

BRIEF SUMMARY OF THE INVENTION

Disclosed herein, and in the associated drawings, are various embodiments of a new steering stabilizer, alternately referred to as a steering assist member, as well as examples of steering systems in which the steering assist member can be used. Various embodiments of present invention include return-to-center features, and have full pressure, or nearly full pressure, or at least sufficient centering pressure, with essentially any move off center. The embodiments described herein are much less complicated than many prior art devices, and they are much better than current products on the market that only provide damping. The embodiments described herein are also better than the prior art coil spring products that can only provide very low forces at the center position and that only provide ramped-up pressure as larger turns are made. Higher pressure is needed at any movement off-center to resist road hazards or wind, and such higher pressure is provided by the present invention. Coil spring units have very little pressure until reaching a displacement of one inch or more, and that much movement only generally occurs in slow speed turns. The present invention provides a real solution that can work for all stabilizer applications, large or small.

Unlike some of the current very large units for class A RV's, the new unit of the present invention is relatively small. For example, for class C RV's and Jeep brand vehicles, the present invention could have a 1½" OD (outer diameter) and be approximately 20" long. Only when tie rod travel gets longer will the unit grow longer, but not bigger in diameter. The units are so small they can be a directly bolted in replacement on most Class C RV's and Jeeps, as well as many trucks such as Ford F-150 thru the F-450 series and van-based commercial conversions using Ford E-150 thru E-450 like ambulances.

The market for the new unit is very large, including large Class A RV's to Class C RV's and small gas Class A's, among others. Such vehicles are some of the units that need the most help because they are essentially very large boxes, which are lightweight, and thus are easily affected by adverse wind and road conditions.

Many prior art coil-over and coil spring steering stabilizers have no pressure at center, and relatively small pressure in the first ¼ to ⅜ inch of tie rod travel (perhaps only about 10 to 30 pounds of force for a small unit, or about 40-70 pounds for a relatively large unit). Testing of the tie rod on highway and off-road action shows that at any speed over 2-3 miles per hour, the tie rod is moving only a relatively small amount. Thus, coil-overs do nothing to help the driver in 99% of driving situations (although they are great in parking lot demonstrations with full turns of the wheel).

Embodiments of the present new device start with sufficient design pressure (80 pounds, 100 pounds, 150 pounds, 200 pounds, etc.) from zero, and then with any movement of tie rod over 2 mm, they provide full holding pressure as an assist. Essentially all prior art shock-based stabilizers/dampers, regardless of price, are valved 50:50, and are just dampers that resist movement using stiffness (restriction) after motion is started. They have zero centering or return-to-center ability. One of the advantages of the present invention is that provides complete control before an outside force tries to make the steering linkage move, not after it has moved.

Tests of embodiments of the present invention on lifted and modified vehicles, both off road and on highway, have shown that drivers prefer the present invention over popular coil-over devices because, for example, the coil-over devices can have a floaty center point due to lack of spring pressure. Tests of the new unit have been conducted on sand and mud, including in vehicles modified with a long arm lift kit. The long arm modification is a fairly serious off-road modification. Vehicles with big tires tend to dart significantly in sand and mud because they follow the contours. The unit of the invention eliminated darting, and even made the handling highly improved, by providing improved control and better tracking. In certain situations, hands-free steering is even possible, even over rough, rutted terrain, due to the strong return-to-center forces provided by the present device.

More specifically, the present invention provides a centering stabilizer including a first section that produces a pulling force along a longitudinal axis; a second section that produces a pushing force along a longitudinal axis; and connecting means that connects the first and second sections such that the longitudinal axis of the first section is aligned with the longitudinal axis of the second section. The stabilizer also includes first mounting means attached to the first section, wherein the first mounting means securely attaches the centering stabilizer to a first portion of a steering system of a vehicle, and second mounting means attached to the second section, wherein the second mounting means securely attaches the centering stabilizer to a second portion of the vehicle, wherein when the set of steerable wheels of the vehicle are displaced from a straight ahead driving position, a distance between the first portion of the vehicle steering system and the second portion of the vehicle changes.

Additionally, the present invention also relates to a system for centering and stabilizing a set of turning wheels of a vehicle, wherein the system comprises: a steering linkage member that is configured and arranged to provide a steering motion to a set of steerable wheels; and a steering assist member that includes one end operatively attached to a first portion of the steering linkage member and another end attached to a second portion of the vehicle, wherein when the set of steerable wheels are displaced from a straight ahead driving position, a distance between the first portion of said steering linkage member and said second portion of the vehicle changes. Preferably, the steering assist member includes: a first section configured and arranged to produce a pulling force along a longitudinal axis thereof, wherein the first section extends between two longitudinal ends that are defined as a first proximal end and a first distal end; a second section configured and arranged to produce a pushing force along a longitudinal axis thereof, wherein the second section extends between two longitudinal ends that are defined as a second proximal end and a second distal end; and connecting means configured and arranged to connect the first proximal end to the second proximal end such that the longitudinal axis of the first section is aligned with the longitudinal axis of the second section.

Additionally, the present invention also relates to a vehicle comprising: a vehicle frame; a pair of wheel hubs configured and arranged to be turned with respect to the vehicle frame, wherein the pair of wheel hubs are defined as a left wheel hub and a right wheel hub; a right steering knuckle operatively connected to the right wheel hub, wherein the right wheel hub is configured and arranged to rotate with respect to the right steering knuckle; and a left steering knuckle operatively connected to the left wheel hub, wherein the left wheel hub is configured and arranged to rotate with respect to the left steering knuckle. The vehicle also includes a right outer tie rod operatively connected to the right steering knuckle via a right tie rod end; a left outer tie rod operatively connected to the left steering knuckle via a left tie rod end; and a center link operatively connected to both the right outer tie rod and the left outer tie rod. The steering assist member has a first end connected to the vehicle frame and a second end securely connected to the center link, wherein the steering assist member provides a predetermined maximum return-to-center force, and further wherein at least two-thirds of the predetermined maximum return-to-center force is applied when said steering assist member is displaced along its central axis by 2 mm.

The present invention also relates to a centering stabilizer that includes a first section configured and arranged to produce a pulling force along a longitudinal axis thereof and a second section configured and arranged to produce a pushing force along a longitudinal axis thereof, wherein the first section and the second section are configured and arranged such that the longitudinal axis of the first section is aligned with the longitudinal axis of the second section. There is also preferably a first mounting means attached to a first distal end of the centering stabilizer, wherein the first mounting means is configured and arranged to securely attach the centering stabilizer to a first portion of a steering system of a vehicle, and further wherein the first portion of the vehicle steering system is configured and arranged to move in association with a set of steerable wheels; and a second mounting means attached to a second distal end of the centering stabilizer, wherein the second mounting means is configured and arranged to securely attach the second section of the centering stabilizer to a second portion of the vehicle, wherein when the set of steerable wheels are displaced from a straight ahead driving position, a distance between the first portion of said vehicle steering system and said second portion of the vehicle changes.

In certain embodiments of the centering stabilizer according to the previous paragraph, the first section comprises a gas push-type spring, and the second section comprises a gas traction spring. In other embodiments of the centering stabilizer according to the previous paragraph, the first section comprises a compression coil spring, and the second section comprises a tension coil spring. Further, certain embodiments may include a combination of components in which at least one of the first section and the second section comprises a gas spring. In various embodiments related to the previous paragraph, the longitudinal axis of the first section and the longitudinal axis of the second section are aligned along a central axis. Optionally, the stabilizer may include a single piston rod extending within both the first section and the second section. As another option, the stabilizer may consist of a single housing associated with both the first section and the second section, where the single housing is divided by a dividing member into a first chamber, which is associated with the first section, and a second chamber, which is associated with the second section. Further, the first chamber may be further divided into two sections, a first section that is filled with a pressurized gas and a second section that is not under pressure, and the second chamber may be filled with a pressurized gas.

The present invention also relates to a system for centering and stabilizing a set of turning wheels of a vehicle, wherein the system comprises: a steering linkage member that is configured and arranged to provide a steering motion to a set of steerable wheels; and a steering assist member that includes one end operatively attached to a first portion of the steering linkage member and another end attached to a second portion of the vehicle. When the set of steerable wheels are displaced from a straight ahead driving position, a distance between the first portion of the steering linkage member and the second portion of the vehicle changes. The steering assist member may comprise a first section configured and arranged to produce a pulling force along a longitudinal axis thereof; and a second section configured and arranged to produce a pushing force along a longitudinal axis thereof, wherein the first section and said second section are configured and arranged such that the longitudinal axis of the first section is aligned with the longitudinal axis of the second section.

Finally, embodiments of the present invention include a centering stabilizer comprising a first section configured and arranged to produce a pulling force along a longitudinal axis thereof and a second section configured and arranged to produce a pushing force along a longitudinal axis thereof, wherein the first section and the second section are configured and arranged such that the longitudinal axis of the first section is aligned with the longitudinal axis of the second section. There is a first mounting means attached to a first distal end of the centering stabilizer and a second mounting means attached to a second distal end of the centering stabilizer Preferably, the first section comprises a gas push-type spring and the said second section comprises a gas traction spring.

BRIEF DESCRIPTION OF THE SEVERAL VIEWS OF THE DRAWINGS

Preferred embodiments of the present invention are described herein with reference to the drawings wherein:

FIG. 14 is a perspective view of the steering assist member of FIG. 13 that includes an adjustable trim device.

DETAILED DESCRIPTION OF THE INVENTION

The present invention relates to various embodiments of a steering assist member for a vehicle, which can also be used as a steering stabilizer, as well as to the steering systems and vehicles that incorporate the present steering assist member or stabilizer.

Figure 1:
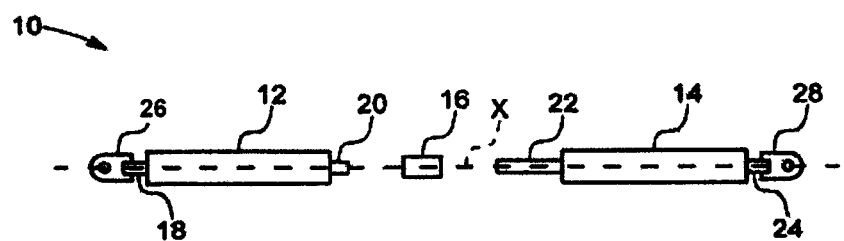
FIG. 1 is a schematic exploded view of a first embodiment of the present steering assist member.
Figure 2:
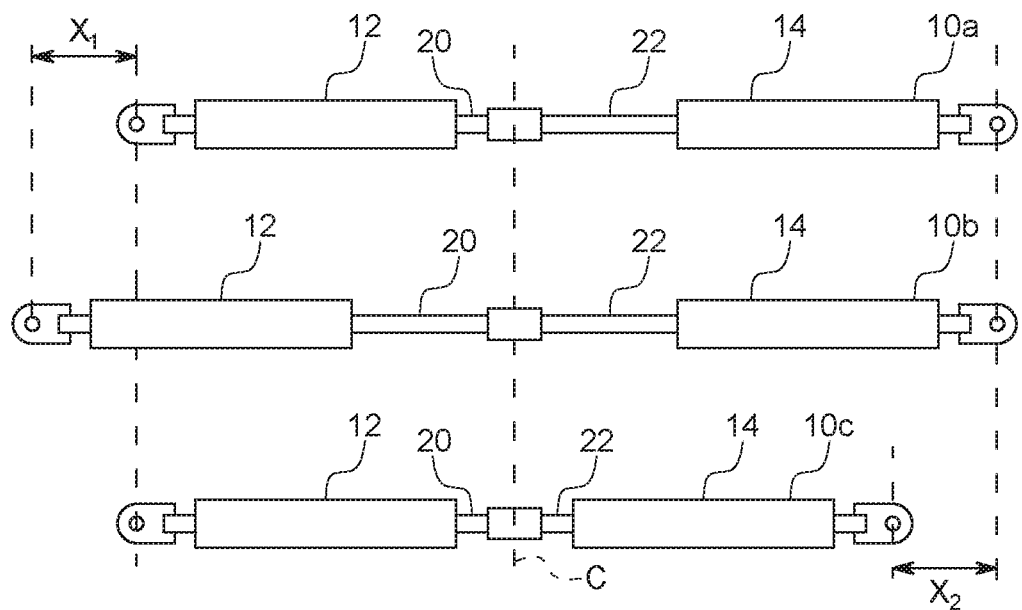
FIG. 2 is a schematic of the steering assist member of FIG. 1, shown under three different conditions (with the vehicle moving straight ahead; with the vehicle making a right turn; and with the vehicle making a left turn)

FIG. 1 is a schematic representation of the main components of an embodiment of the present steering assist member 10, shown in an exploded view, and FIG. 2 shows those same components of the steering assist member 10 in an assembled state, with no turning force thereon (top), a right turning force thereon (middle), and a left turning force thereon (bottom).

In particular, the steering assist member 10 of FIG. 1 includes a first section 12, a second section 14, and a connecting member 16 for connecting the first section 12 with the second section 14. Generally, the first section 12 provides a pulling force, and the second section 14 provides a pushing force, or vice versa (as the sections 12 and 14 may be switched, with section 12 providing the pushing force and section 14 providing the pulling force). More specifically, the first section 12 is configured and arranged to produce a pulling force along a longitudinal axis X thereof. The first section 12 extends between two longitudinal ends (18, 20) that are defined as a first proximal end 18 and a first distal end 20. The second section 14 is configured and arranged to produce a pushing force along the longitudinal axis X thereof. The second section 14 extends between two longitudinal ends (22 and 24) that are defined as a second proximal end 22 and a second distal end 24. The ends 18, 20, 22 and 24 may consist of rods, which can be threaded, or otherwise configured, to be connected to other components.

The proximal end 20 of the first section 12 and the proximal end 22 of the second section 14 may both be externally threaded so that they can be received within an internally threaded portion of the connecting member 16 (which may be, for example, a nut). Other means of connecting the first section 12 to the second section 14 are also contemplated as being within the scope of the invention, such as direct welding of the shafts together (with or without a supporting sleeve surrounding the welded joint), welding or otherwise fixing a sleeve around the adjacent ends of both shafts, having one shaft provided with a male threaded portion and the other shaft being provided with a female threaded portion, or even providing a unitary shaft that extends between the first and second sections. As can be seen in FIG. 1, the connecting member 16, or other connecting means, is configured and arranged to connect the proximal end 20 of the first section 12 to the proximal end 22 of the second section 14 such that the longitudinal axis of the first section 12 is aligned with the longitudinal axis of the second section 14 (i.e., both along the axis x).

The first and second sections (12, 14) may be formed of any types of mechanisms that are capable of providing the necessary pulling and pushing forces. For example, the first section 12 may consist of a gas push-type spring, and the second section 14 may consist of a gas traction spring (also referred to as a pull-type gas spring). Depending on the size of the vehicle, the gas springs could each be rated at between 20 and 500 pounds, or more. Alternatively, the first and second sections 12 and 14 may consist of coil springs, where the first section 12 consists of a compression coil spring, and the second section 14 consists of a tension coil spring. Each of the springs could be rated between about 20 and about 250 pounds per inch, or more. It is also contemplated that different types of mechanisms may be used for the first and second sections, such as providing a gas push-type spring for the first section and a tension spring for the second section, or by providing a compression coil spring for the first section and a gas traction spring for the second section.

Preferably, the first and second sections (12,14) are each configured and arranged to provide a pre-loaded force, such that the pulling force or the pushing force starts with any displacement from the "centered" position. Thus, with the present invention, which, in certain embodiments uses a combination of a first section 12 with a pulling force and a second section 14 with a pushing force, the force at zero displacement is at least two thirds (66.67%) of the full force, and/or the force at a slight displacement (i.e. about 2 mm) from "center" is also at least two thirds of the full force of the unit, which force increases with greater displacement until reaching the full return force of the unit. Accordingly, the present invention is providing a return-to-center force during normal driving (which could involve displacements of ¼ to ⅜ of an inch, or less) that is significant enough to actually return the wheels to their straight ahead forward driving position. For example, in a unit with a full force of 150 pounds, the initial and/or slight displacement force would be 100 pounds; in a unit with a full force of 300 pounds, the initial and/or slight displacement force would be 200 pounds; in a unit with a full force of 450 pounds, the initial and/or slight displacement force would be 300 pounds, etc.

One of the primary differences between mechanical springs and gas springs is the force provided at their free length. Gas springs always require some initial force to begin compression (or tension, depending on the type of spring), while mechanical springs have a characteristic known as free length. This is the length of the spring with no force applied. In coil springs, the force required to move the spring begins at zero and increases according to the spring rate. Gas springs in their "free length" require some initial force before any movement takes place. After the full initial force is applied, the gas spring will begin to compress (or expand, depending on the type of gas spring). This force can range from 20 to 450 pounds. In mechanical springs, this initial force is called pre-load and requires additional hardware to achieve. One example of a type of additional hardware to provide the pre-load is shown in the FIG. 6 embodiment, as described below.

Another significant difference between coil (mechanical) springs and gas springs is the spring rate. Gas springs can be designed with a very low spring rate utilizing a small package. A similar mechanical spring would require as much as twice the package space. The ability to have a controlled rate of extension is another major difference between the two types of springs (gas and coil). Gas springs can provide a rate of extension (controlled release of the stored energy) that can be set to a prescribed velocity. Mechanical springs do not have this ability. In fact, gas springs can have multiple extension rates within the same gas spring (typically two: one through the majority of the extension stroke, and another at the end of the extension stroke to provide dampening).

Returning to FIG. 1, this figure also shows that there is a mounting means 26, also referred to as a first mounting means, attached to the first distal end 18 of the first section 12, and a mounting means 28, also referred to as a second mounting means, attached to the second distal end 24 of the second section 14. In certain embodiments, the first and second mounting means (26 and 28) each consist of a metal bracket with an opening therein through which a bolt may be passed to affix the steering assist member 10 to other components. Although FIG. 1 shows the openings both facing the same direction, the openings may be oriented in a variety of different directions with respect to each other (such as having one opening rotated by 90° with respect to the other one), depending upon the desired mounting configurations for receiving each mounting means. Alternate configurations for the mounting means 26 and 28 are also contemplated for this embodiment, and for the other embodiments described herein.

In certain embodiments, the first mounting means 26 is configured and arranged to securely attach the first section 12 of the steering assist member (centering stabilizer) 10 to a portion of a vehicle steering system (such as the tie rod, the center link or pitman arm) and the second mounting means 28 is configured and arranged to securely attach the second section 14 of the steering assist member (centering stabilizer) 10 to a frame of a vehicle (or other component that is affixed to the frame, and thus does not move relative to the frame), as described hereinbelow.

Figure 1A:
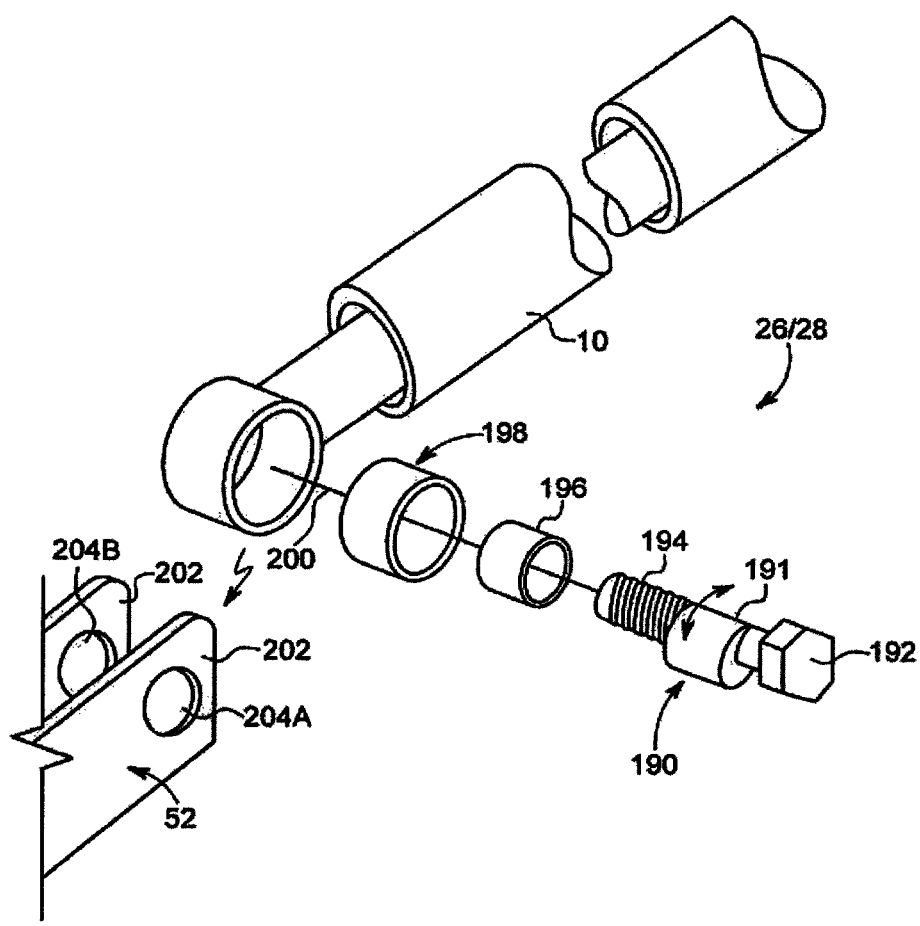
FIG. 1A is an exploded view of an example of a mounting means that is configured to allow for minor adjustments to the mounted length of the stabilizer to facilitate location the stabilizer in the proper centering position.

FIG. 1A is an example of a mounting means 26/28 (i.e., it may be used as either the first mounting means 26 or the second mounting means 28) that is configured for mounting the steering assist member (centering stabilizer) 10 to the frame 52 of a vehicle (or a connector rigidly secured to the frame), and which provides for small adjustments (such as about ⅛ inch in either direction) in the mounted location of the stabilizer to change the mounted length of the stabilizer. The mounting means 26/28 of FIG. 1A includes an eccentric bolt 190 (also known as a castor adjustment bolt) provided with an eccentric shaft portion 191 thereon whose center is offset from the center of the head 192. The threaded end 194 of the eccentric bolt 190 is configured to be inserted into a bushing 196 that is preferably made of steel or other rigid metal. The bushing 196 is configured to be inserted into a sleeve 198 that is preferably made of neoprene or other rigid plastic, which sleeve is configured and arranged to be inserted within a socket 200 attached to one end of the stabilizer 10.

During mounting, the sleeve 198 and the bushing 196 are inserted into the socket 200, and these components are inserted between legs 202 of the frame 52. The eccentric bolt is then inserted through first aperture 204A of the frame, and then into the bushing 196 (which bushing is within both the sleeve 198 and the socket 200), and then through the second aperture 204B of the frame, such that the eccentric shaft portion 191 is seated within the bushing 196, where the bolt can be tightened by a having the threaded portion 194 mate with a complementary interior threaded portion of a nut (not shown). To adjust the mounted length of the stabilizer 10, the bolt is loosened, and rotated by 90° or less until the desired location is reached due to the eccentric shaft portion 191. The bolt is then re-tightened to lock the stabilizer at the new location. Such a configuration makes it easier to make slight adjustments, without needing to release the other end of the stabilizer from the tie rod (or other location).

FIG. 2 is a schematic representation of the steering assist member 10 of FIG. 1 shown under three different conditions (labelled as steering assist members 10a, 10b and 10c), as if installed in a vehicle, where the top portion of the figure represents the condition of steering assist member 10a when the vehicle is going straight; the middle portion of the figure represents the condition of the steering assist member 10b when the vehicle is making a right turn; and the lower portion of the figure represents the condition of the steering assist member 10c when the vehicle is making a left turn.

Specifically, steering assist member 10a, which represents the situation when the vehicle is going straight, shows how the first section 12 is relaxed (i.e., under no outside pressure) and how the second section 14 is also relaxed (i.e., under no outside pressure).

Steering assist member 10b, which represents the situation when the vehicle is making a right turn, shows how the first section 12 is pulled out to the left, with the rod at end 20 being pulled outwardly of the cylinder, but how second section 14 is relaxed (i.e., under no outside pressure). Comparing steering assist member 10a with steering assist member 10b shows that the left-hand side of the member 10b is pulled toward the left by the distance X1, while the right-hand side of member 10b is aligned with the right-hand side of member 10a.

Finally, steering assist member 10c, which represents the situation when the vehicle is making a left turn, shows how the first section 12 is relaxed (i.e., under no outside pressure), while the second section 14 is compressed to the left, with the visible portion of the rod 22 being shortened because it has slid into the cylinder. Comparing steering assist member 10a (and member 10b) with steering assist member 10c shows that the right-hand side of the member 10b is pushed toward the left by the distance X2, while the left-hand side of member 10c is aligned with the left-hand side of member 10a. Thus, it can be seen that any move off-center either pulls traction on one section (such as on a right turn) or compresses the other section (such as on a left turn).

Figure 3:
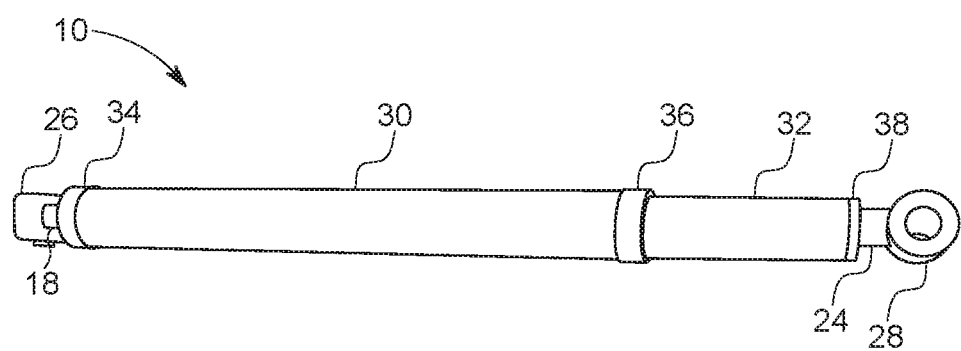
FIG. 3 is an embodiment of the present steering assist member including a protective covering.

FIG. 3 shows an embodiment of the steering assist member 10 that includes a protective covering. In this embodiment, the protective covering consists of a covering member 30 (which covers the second section 14 (the pushing member), shown in FIG. 1) and a covering member 32 (which covers the first section 12 (the pulling member), shown in FIG. 1), wherein the first covering member 30 is of a larger diameter than that of the second covering member 32, thereby allowing the second covering member to slide within the first covering member. To prevent debris from entering into the covering members, end seals (with appropriate center apertures for the rods) may be provided such as end seals 34, 36 and 38. The covering members 30 and 32 and the end seals 34, 36 and 38 are preferably made of metal to withstand the environment found below a vehicle. Additional sealing members may be provided around the rods, if desired. Optionally, the area around end seal 36 may be provided with a generally cylindrical flexible bellows seal (not shown) that surrounds end seal 36, if desired.

Figure 4:
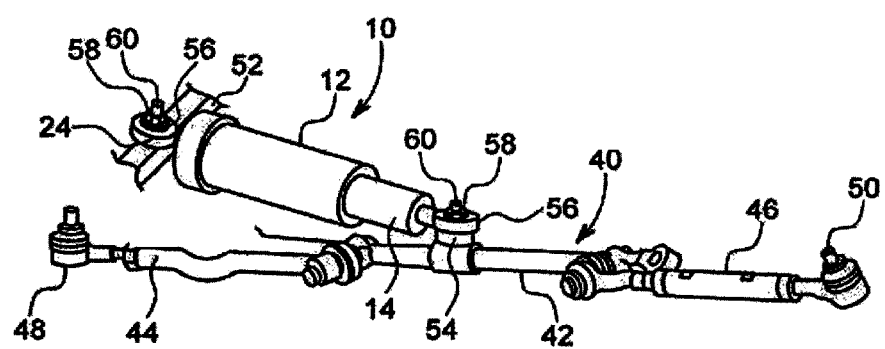
FIG. 4 shows one example of how the present steering assist member can be incorporated into a steering linkage.

FIG. 4 shows one example of how the steering assist member 10 can be incorporated into a steering linkage. In FIG. 4, the steering assist member 10 is mounted on a vehicle steering system 40 including a center link 42 (or center tie rod) and outer tie rods 44 and 46. When the steering wheel of the vehicle is turned, the center link 42 is moved transversely to move the outer tie rods 44 and 46 to thereby turn the wheels of the vehicle with respect to the frame, which wheels (or more specifically, wheel hubs (such as left hub 80 of FIG. 5, where right hub is not shown, that are configured and arranged to be turned with respect to the vehicle frame 20) are attached to tie rod ends 48, 50 (such as via a pair of steering knuckles, such as left and right knuckles 82 shown in FIG. 5). The steering assist member 10 of the present invention is connected between the center steering link 42 and an element 52 of the vehicle frame. The steering assist member 10 includes first and second sections 12 and 14 each supporting a mounting means in the form of an attachment collar 54 held in place on the vehicle by a washer 56 and nut 58 engaging a mounting stud 60. The steering assist member 10 continuously urges the steering linkage toward a normal or centered position in which the vehicle wheels are in their straight-ahead position.

Figure 5:
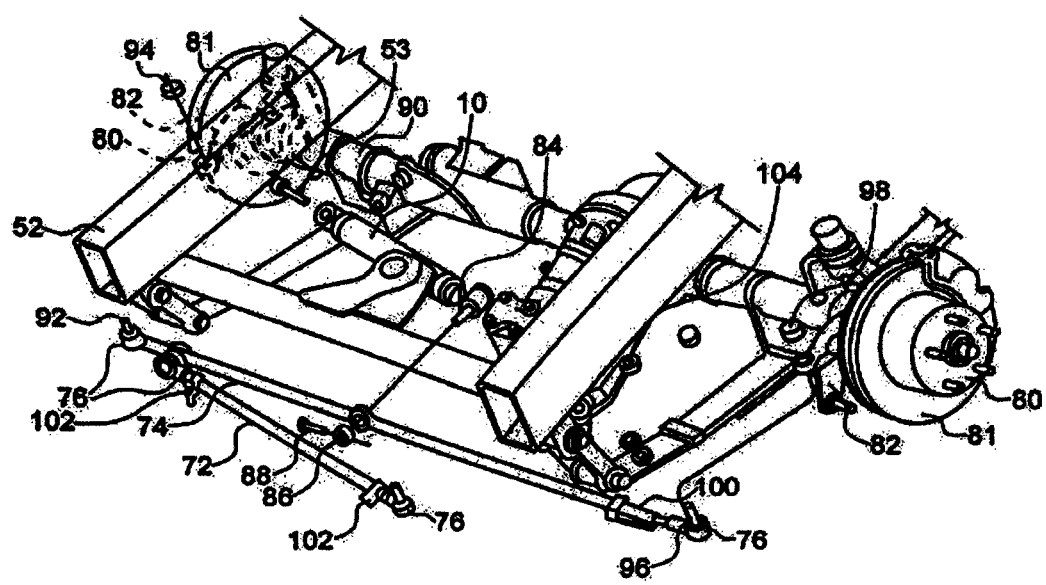
FIG. 5 shows another example of how the present steering assist member can be incorporated into a steering linkage.

FIG. 5 shows another example of how the steering assist member 10 can be incorporated into a different version of a steering linkage. In FIG. 5, the steering assist member 10 is mounted on a vehicle steering system 70 that includes a drag link 72, a tie rod 74, and four tie rod ends 76. As can be seen in FIG. 5, this configuration includes vehicle frame element 52 and a pair of wheel hubs 80 configured and arranged to be turned with respect to the vehicle frame 52, wherein the pair of wheel hubs are defined as a left wheel hub 80 and a right wheel hub 80, and brake discs 81 associated with the wheel hubs. There is a right steering knuckle 82 operatively connected to the right wheel hub 80, wherein the right wheel hub is configured and arranged to rotate with respect to the right steering knuckle. Similarly, there is a left steering knuckle 82 operatively connected to the left wheel hub 80, wherein the left wheel hub is configured and arranged to rotate with respect to the left steering knuckle.

This configuration of FIG. 5 also includes tie rod 74 that is operatively connected to the right and left steering knuckles 82 via a pair of tie rod ends 76. In this embodiment, the steering assist member 10 has a first end connected to the vehicle frame 52 (via a connection method means that may include bolt 53, or other connection assembly) and a second end that is securely connected to the tie rod 74, such as via a stud 84, a nut 86, and a cotter pin 88 (although other attachment methods are contemplated). Alternatively, the first end of the steering assist member 10 may be connected to a portion of one of the steering knuckles 82, or to the axle housing 90, instead of being attached directly to the vehicle frame 52.

Specifically, the right end of the tie rod 74 is connected to the right steering knuckle 82 via the tie rod 76 (or a ball stud, or other desired connection method) by connecting stud 92 through a hole on the right steering knuckle 82 and affixing a nut 94 thereto. The left end of the tie rod 74 is connected to the left steering knuckle 82 via the tie rod end 76 with the aid of stud 96 and nut 98 (or other desired connection method). The tie rod end 76 is preferably connected to the tie rod 74 via an adjustment sleeve 100.

Finally, the drag link 72 includes a tie rod end 76 one each end thereof, connected to the drag link via clamps 102. As can be seen in FIG. 5, one end of the drag link 72 is connected to the tie rod 74, and the other end is connected to a pitman arm 104, which translates the angular motion from the steering box (not shown) into linear motion.

The steering assist member 10 of FIG. 5 (or of FIG. 4) may consist of any of the members 10 described herein. Further, the steering assist member 10 of FIG. 5 (or FIG. 4) may consist of a single self-contained unit of a mechanically powered strut of the self-centering type, which provides loading to return to a neutral position from both directions, or it may consist of a self-centering damper with a single pressurized gas chamber with a piston assembly therein. In addition to the embodiments of the steering assist member described herein, embodiments are also contemplated in which the longitudinal axis of the first section is aligned with that of the second section such that they are parallel to each other, as opposed to being co-linear as shown and described with regard to the exemplary embodiments herein. However, whatever type of steering assist member is utilized, it must be able to provide the necessary return-to-center force at zero displacement (or very small displacement, such as 2 mm), which is estimated be at least 40-50 pounds, or more, for certain applications, and at least 70-100 pounds for other applications (such as the reverse motion of a dinghy described below). Alternatively, the steering assist member should be rated with a predetermined maximum return-to-center force, and it should be designed to operate such that at least two thirds of the predetermined maximum returnto-center force is applied when the steering assist member is displaced along its central axis by 2 mm.

Figure 6:
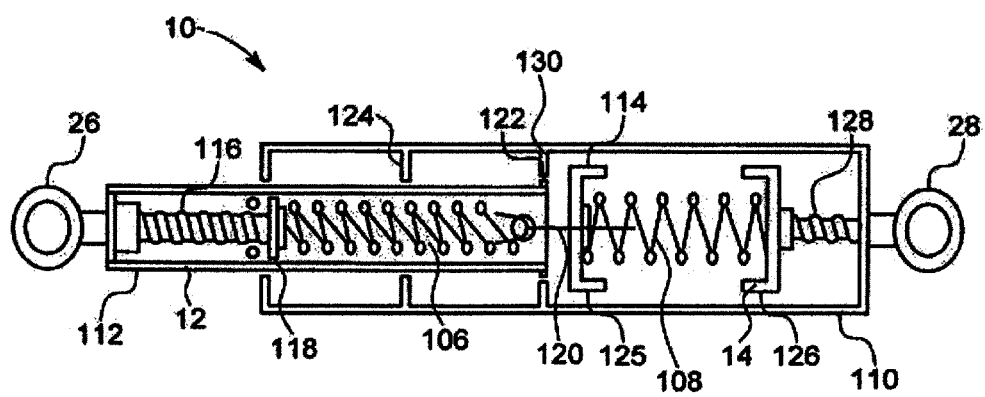
FIG. 6 is a schematic of a second embodiment of the present steering assist member.

FIG. 6 shows another embodiment of the present steering assist member 10. This embodiment is based on the use of a compression coil spring in combination with a tension coil spring. Generally, the FIG. 6 embodiment includes a first section 12 that is configured and arranged to produce a pulling force along a longitudinal axis thereof via the use of a tension coil spring 106; a second section 14 configured and arranged to produce a pushing force along a longitudinal axis thereof via the use of a compression coil spring 108; an outer casing 110, which is preferably cylindrical; and first and second mounting means 26 and 28. Of course, the springs within the first and second sections can be reversed such that the first section includes the tension spring and the second section includes the compression spring.

More specifically, the FIG. 6 embodiment includes a first section casing 112, which is preferably cylindrical, and which surrounds the tension coil spring 106. A section of ACME threads 116 are attached to one end of the first section casing 112, and the tension coil spring 106 is operatively mounted to the threads 116 on one side thereof. In particular, one end of spring 106 is connected to a rider member 118, which includes an internally threaded aperture, which allows for adjusting the force of spring 106 by moving rider member 118 in one direction or the other along threads 116. The other end of the tension coil spring 106 is secured to a connecting member 120, which connects the first section 12 to the second section 14. The end of the first section casing 112 nearest to the connecting member 120 includes a flange 122 (which may be annular or divided) on an outer periphery thereof that is configured and arranged to make contact with a stop member 124 (which may be annular or divided) on an inner periphery of the outer casing 110 to prevent the first section assign 112 from sliding out of the outer casing 110. It should be noted that both flange 122 and first stop 124 can be annular members, but if one of flange 122 or first stop 124 is not annular (and is thus divided), it is preferable that the other member be an annular member to ensure contact between the flange and the stop in situations where there has been relative rotation between the first section casing 112 and the outer casing 110.

The FIG. 6 embodiment also includes a second section casing 114, which preferably consists of two sections, 125, 126. The compression coil spring 108 is provided within the second section casing 114, with one end of the spring 108 attached to the end of the section 125 of the casing 114 that is connected to the connecting member 120, and with the other end of the spring 108 attached to the other section 126 of the casing 114. Section 126 of the casing 114 preferably includes a threaded aperture for affixing this member to the ACME threads 128. Such a configuration allows for adjusting the force of spring 108. The interior of the outer casing 110 preferably includes a second stop 130, which is preferably annular, but need not be, and which is configured to prevent the second section casing 114 from moving too far to the left.

Although the FIG. 6 embodiment uses coil springs instead of gas springs, as in some of the other embodiments, the principles of operation and benefits of this embodiment are generally the same as the other embodiments. Each of the springs could be rated between about 20 and about 250 pounds per inch, or more.

Figure 7:
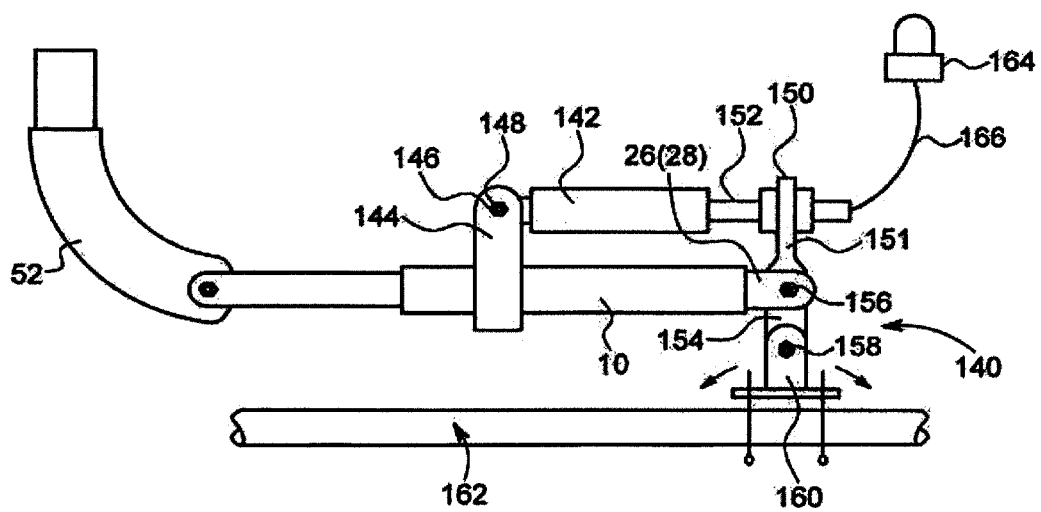
FIG. 7 is a schematic of an embodiment in which the present steering assist member is incorporated into a dynamically adjustable mount.
Figure 8A:
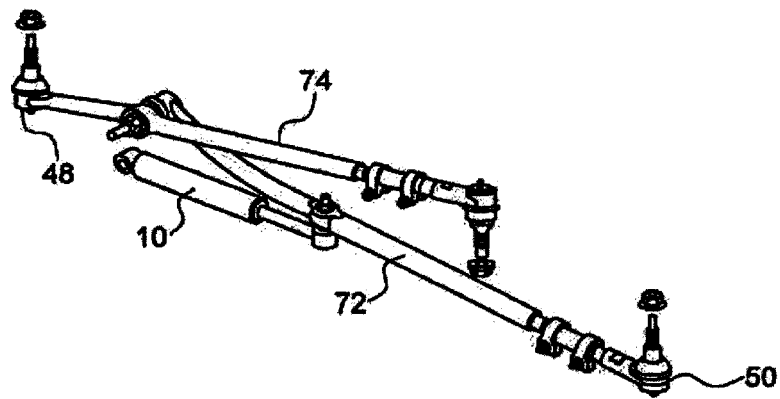
FIGS. 8(A)-8(E) show various additional examples of how the present steering assist member can be incorporated into different versions of steering linkages.
Figure 8B:
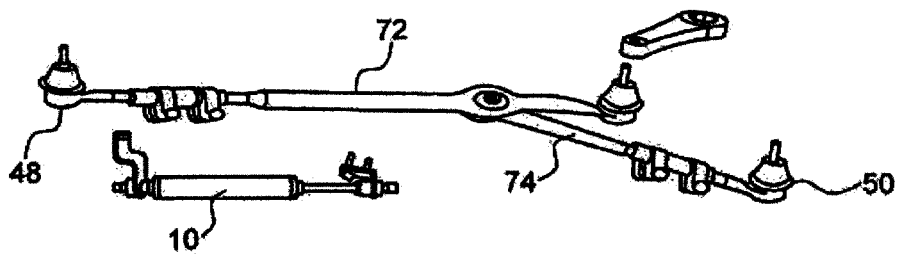
Figure 8C:
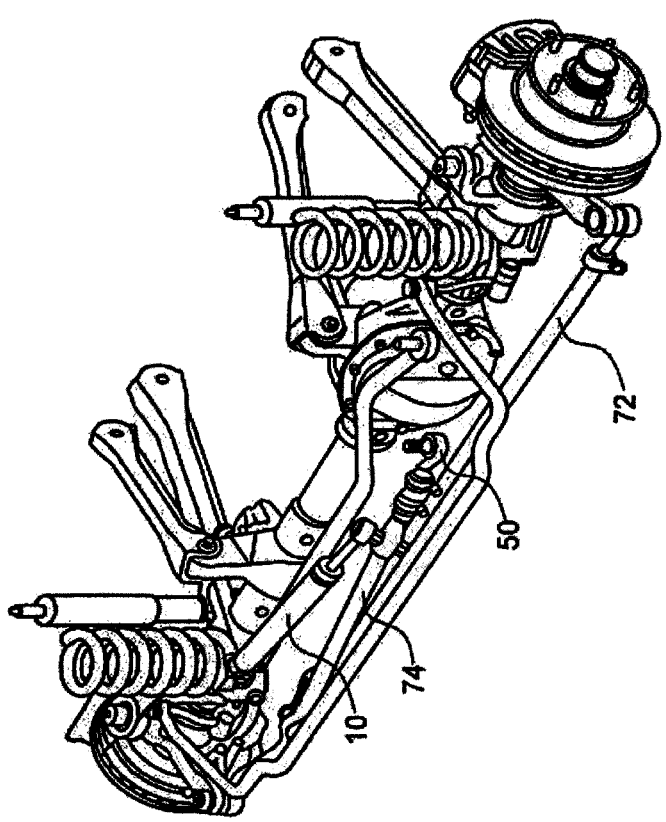
Figure 8D:
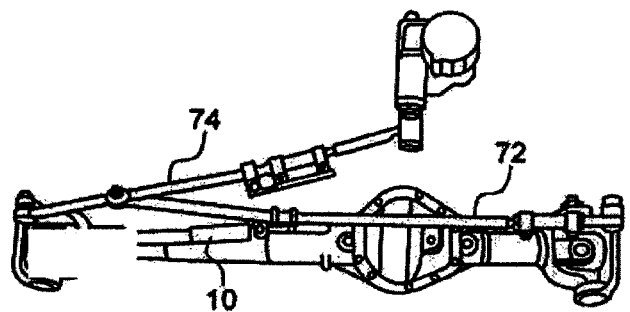
Figure 8E:
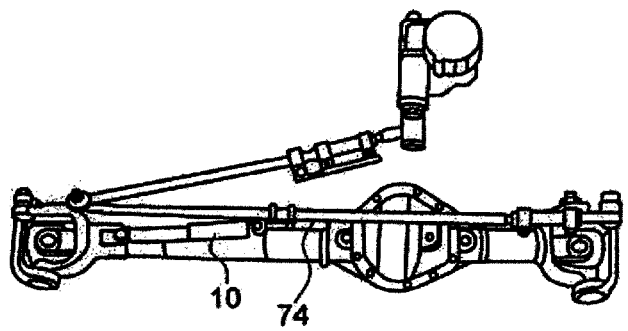

FIG. 7 shows a schematic of an embodiment in which the present steering assist member 10 is included in a dynamically adjustable mount 140, which allows for the adjustment of the "centered" position provided by the steering assist member 10 from within the passenger compartment/cab of the vehicle. For example, when a steering assist member is installed within the steering system of a vehicle, the apparent "centered" position could be when the vehicle's front wheels are aligned so that the vehicle will move forward in a straight line. However, either due to changing conditions (such as shifting vehicle load, unevenly inflated tires, severe cross winds, etc.) or due to an original error in the positioning of the steering assist member resulting in a slight displacement from providing a true "centering" force, the arrangement of the steering assist member may need to be dynamically adjusted so that it provides a true "centering" force. The FIG. 7 embodiment of a mount for the steering assist member shows one example of a system which provides for dynamically adjusting the "centered" position from within the vehicle, either after installation to correct for offset installation or at any time thereafter due to a change in conditions (including while driving the vehicle). It should be noted that any of the embodiments of the steering assist member 10 described herein can be used with the dynamically adjustable steering mount 140, and that it is also contemplated that other types of steering assist members or stabilizers could also be used with mount 140.

In this embodiment of FIG. 7, one end of a locking adjustable gas spring 142 is securely mounted to steering assist member 10, such as via first clamp member 144, which includes an opening 146 for receiving a pin member 148 secured to one end of the locking adjustable gas spring 142. The other end of the locking adjustable gas spring 142 is rigidly secured to a second clamp member 150, with an opening of the second clamp member 150 surrounding and securely clamping the movable shaft 152 to prevent relative movement between the shaft 152 and the second clamp member 150. The base 151 of the clamp 150 is either integrally formed with or securely attached to a bar member 154, which includes first and second pins 156, 158 that extend generally parallel to each other and generally perpendicularly with respect to the longitudinal axis of the bar member 154. The first pin 156 is rotatably received within an aperture formed in the mounting means 26 (or 28) of the assist member 10 (thereby defining a first pivot assembly), and the second pin 158 is rotatably received within an aperture formed in clamping member 160 (thereby defining a second pivot assembly), which in this embodiment is securely fixed to a portion of the tie rod 162 that is associated with the steering system of a vehicle, as schematically shown in FIG. 7. This arrangement between the aperture of the clamping member 160 and the pin 158 of the bar member 154 allows for the bar member 154 to pivot about pin 158, as represented by the arrows, as described more fully below. The opposite end of the assist member 10 is attached, directly or indirectly, to the vehicle frame element 52 in any desired method, such as with a pin/aperture configuration.

In operation, the vehicle operator pushes a push button release 164, which is located within the passenger compartment/cab of the vehicle and is connected to the locking adjustable gas spring 142 by a Bowden cable 166 (via a release head, not shown), to unlock the locking adjustable gas spring 142, and the vehicle operator then turns the steering wheel to arrive at the desired centered position, while keeping the button 164 engaged. Once the desired centered position is located, the vehicle operator releases the button 164, and the locking adjustable gas spring 142 is locked in that position. Since the shaft 152 is rigidly connected to the clamp member 150, which is in turn rigidly connected to the bar member 154, axial movement of the shaft 152 results in the bar member 154 pivoting about the pin 158. Such movement effectively changes the resulting "centering" force upon the tie rod 162 in one direction or the other to compensate for an original mis-alignment or a changed condition. The locking adjustable gas spring 142 is preferably of the type configured for rigid locking in both the pull and push-in directions, or rigid locking in the pull direction and at least relatively rigid locking in the push-in direction. Structurally, locking adjustable gas spring 142 could be of the type that includes an oil chamber that is separated from a gas chamber by a floating piston, whereby if a force is applied on the locked spring in the extension direction, the locking force is relatively rigid up to the mechanical strength of the spring, and if a force is applied in the compression direction, the spring remains rigid until the force of the pressure on the floating piston is exceeded. Suitable locking adjustable springs are commercially available from a variety of manufacturers, including Bansbach (such as the easylift line) and Stabilus GmbH (such as the Block-o-Lift line). Such locking adjustable springs are available with forces of between 50 and 1300 Newtons, and with a stroke length of between 10 and 500 mm. One specific example of a locking adjustable gas spring that has been used in the present invention is one that is valued at 100 pounds of push force, which will provide 360 pounds of locking force in compression.

FIGS. 8A-8E show various examples of the types of steering assemblies that the present steering assist member 10 can be incorporated into in order to provide steering assistance and/or centering. It should be noted that any of the embodiments of the steering assist member 10 described herein can be provided into the steering systems of FIGS. 8A-8E. Further, it should also be noted that the dynamically adjustable mount 140 of FIG. 7 could also be provided as a mounting means to mount the steering assist member 10 included in any of the steering systems of FIGS. 8A-8E. In FIGS. 8A-8E, the same reference numbers provided earlier are used for same components of the earlier figures, and thus a detailed description will not be provided herein.

One of the many benefits of the present centering stabilizer/steering assist member is that if the centering stabilizer/steering assist member is installed on a vehicle that is being towed by another vehicle using a tow bar (i.e., with all four wheels of the towed vehicle on the ground), the centering stabilizer/steering assist member maintains the steerable wheels of the towed vehicle (also referred to as a dinghy) in the straight ahead position, with only slight movement, when the operator of the towing vehicle drives the towing vehicle in reverse with the towed vehicle attached thereto (during forward motion of the vehicles, the steerable wheels of the dinghy turn essentially normally). Without the inclusion of the present centering stabilizer/steering assist member in the towed vehicle, the steerable wheels of the towed vehicle tend to be forced into full turn left position or full turn right position when the towing vehicle backs up, and further reverse movement under such a condition can damage the tow bar and/or the towed vehicle and/or the towing vehicle.

Figure 9:
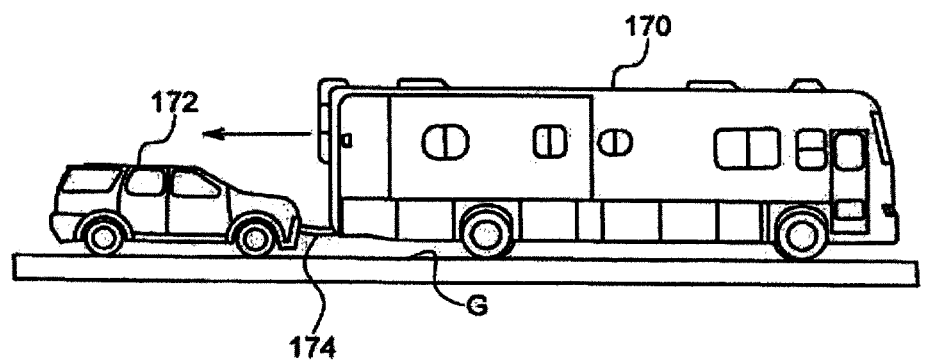
FIG. 9 is an elevational view of a towed vehicle that includes the present steering assist member, shown being towed by a towing vehicle, via the use of a tow bar.
Figure 10:
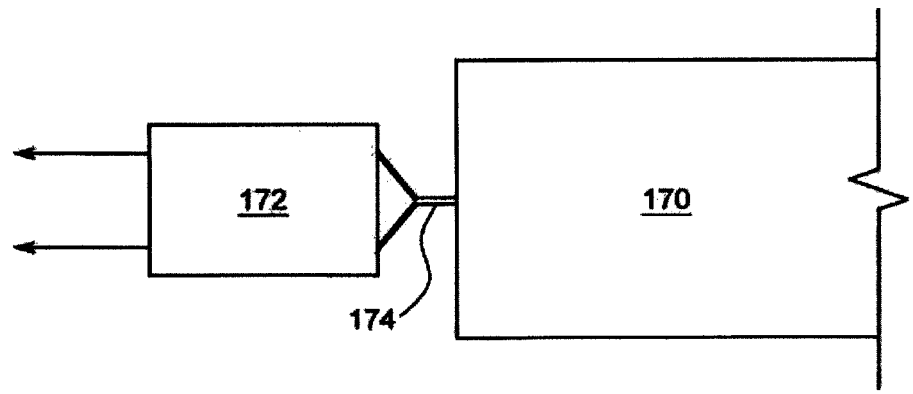
FIG. 10 is a schematic of the vehicles of FIG. 9, showing how the present steering assist member allows for a towing vehicle, with a towed vehicle attached thereto by a tow bar, to be backed-up, whereby the present steering assist member provides forces that maintain the steerable wheels in an aligned, centered position, thereby tracking along a pair of virtual parallel tracks.

Turning now to FIGS. 9 and 10, an explanation is provided of such a benefit of providing the ability to back up a towing vehicle with a towed vehicle attached thereto by a tow bar (i.e., without the use of a trailer that lifts all four wheels of the dinghy off the ground or a tow dolly that lifts the two steerable wheels of the dinghy off the ground) by installing any of the disclosed embodiments of the centering stabilizer/steering assist member 10 into the towed vehicle in the manner described herein. FIG. 9 is an elevational view of a towing vehicle 170 (such as an RV (as shown), or a truck, an SUV, an automobile, or other vehicle capable of towing another vehicle) that is attached to a towed vehicle 172 (such as an automobile, truck, SUV, etc.) by a tow bar 174 (which may be of any desired configuration, such as the Y-configuration shown, or may be of triangular configuration, or simply a straight bar, or other configuration, depending on the user's requirements). As mentioned above, the towed vehicle 172 includes any of the embodiments of the present centering stabilizer/steering assist member 10 installed therein. As can be seen in FIG. 9, the use of the tow bar 174 (as opposed to a tow dolly or trailer) results in all four wheels, including the two steerable wheels, of the towed vehicle 172 being in contact with the ground G. Moving of the towing vehicle 170 in the reverse direction (as shown by the arrow) results in the tow bar 174 pushing the towed vehicle 174 in the reverse direction, and, likewise, moving the towing vehicle in the forward direction results in the tow bar pulling the towed vehicle 172 in the forward direction.

As mentioned above, in a towed vehicle 172 that lacks the present centering stabilizer/steering assist member 10, attempting to back-up the towing vehicle 170 with the towed vehicle 172 attached thereto in the manner shown could result in damage because the rearward force on the steerable wheels of the towed vehicle 172 will cause them to be turned in one direction or the other, thereby hindering further rearward movement, and most likely resulting in damage to the tow bar and either (or both) of the vehicles.

In contrast, when an embodiment of the present centering stabilizer/steering assist member 10 is installed in the towed vehicle 172, the member 10 provides the necessary centering forces to maintain the steerable wheels (i.e., the front wheels) of the towed vehicle 172 in a generally aligned position (with only slight movement to one side or the other), such as represented by the two generally parallel arrows in the schematic drawing of FIG. 10. Accordingly, the towing vehicle, with the towed vehicle attached thereto as shown, can be backed-up easily, and without causing damage to the tow bar or either of the vehicles.

Briefly, the steps involved in such a process include: providing a first vehicle (i.e., a towing vehicle); providing a second vehicle (i.e., a towed vehicle) that includes a pair of steerable wheels with a centering stabilizer/steering assist member installed in association with the steering linkage of the pair of steerable wheels and another pair of wheels; attaching the second vehicle to the first vehicle via a tow bar, such that the pair of steerable wheels and the other pair of wheels are in contact with the ground; and moving the first vehicle in a reverse direction, which causes the second vehicle to also move in a reverse direction, and whereby the centering stabilizer/steering assist member causes the steerable wheels to remain in a generally aligned position due to the return-to-center forces provided by the centering stabilizer/steering assist member, thereby enabling reverse direction movement of the first and second vehicles without damaging the tow bar or either of the vehicles.

Figure 11:
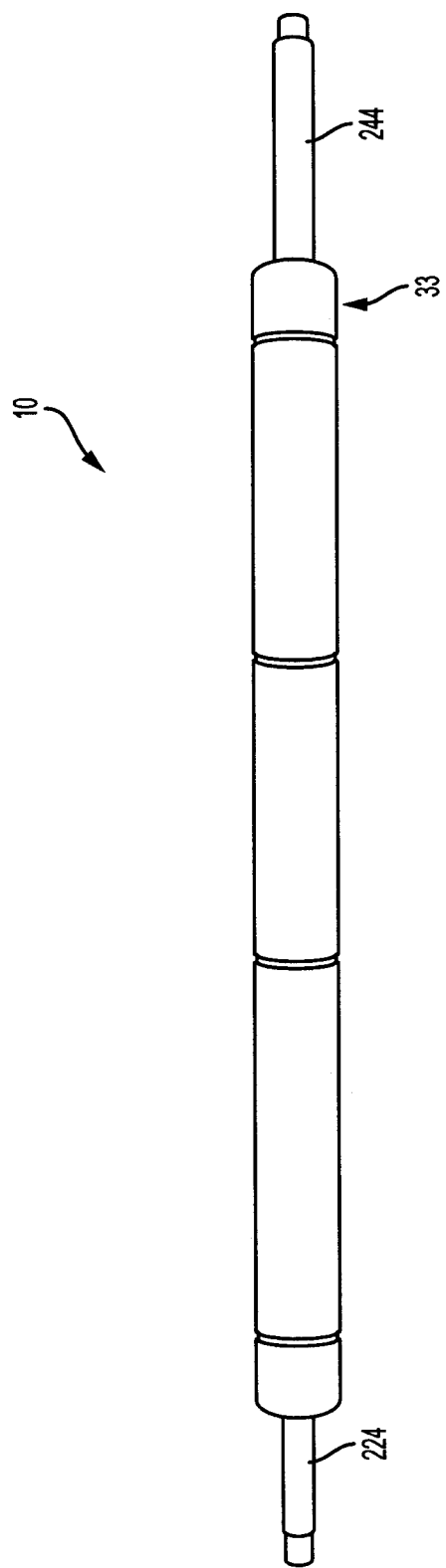
FIG. 11 is a drawing of another embodiment of the present steering assist member in which the first and second sections are enclosed within a single housing (or cover)
Figure 12:
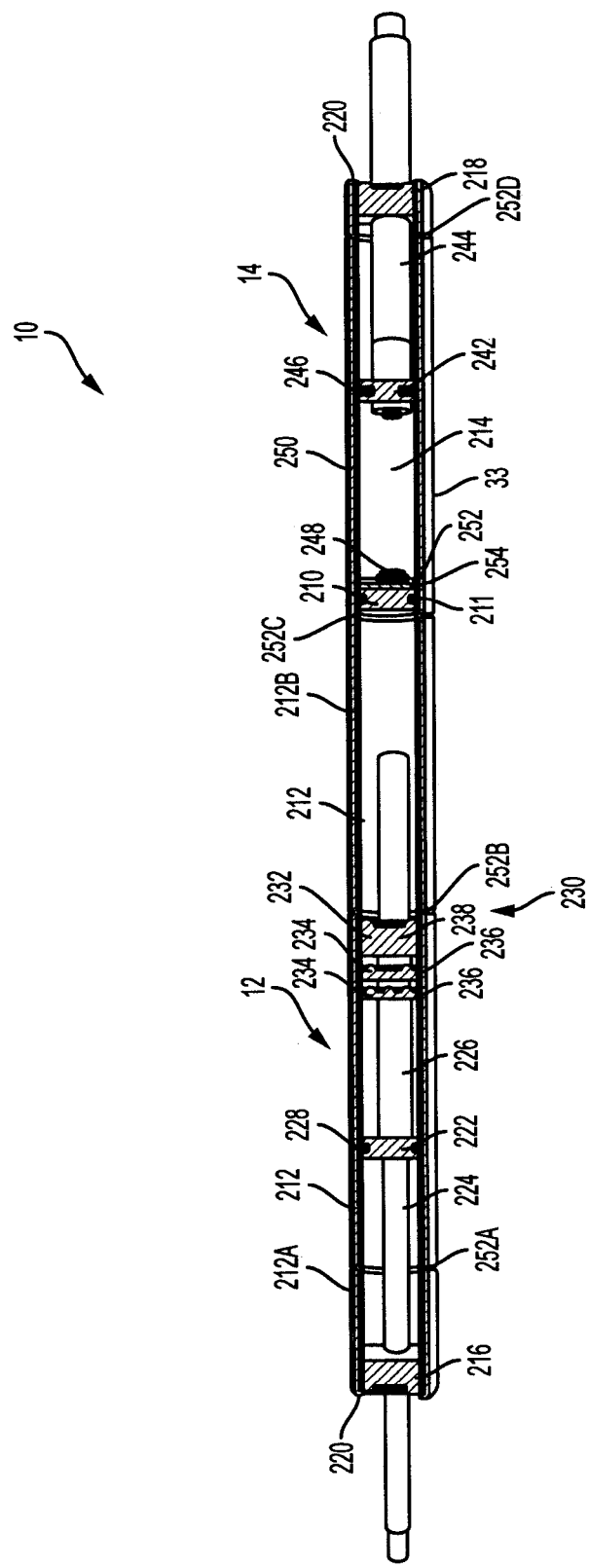
FIG. 12 is a cutaway view of the steering assist member of FIG. 11.

Turning now to FIGS. 11 and 12, another embodiment of the present centering stabilizer/steering assist member is shown and will be discussed. In particular, FIG. 11 is a top view of this embodiment of the centering stabilizer/steering assist member 10, and FIG. 12 is a cut-away view of the same member 10.

As can be seen in FIGS. 11 and 12, this embodiment of the centering stabilizer/steering assist member 10 includes a single cover (or housing member) 33 that contains both the first section 12 and the second section 14. In this embodiment, the first section 12 is a gas traction spring (i.e., a gas pull-type spring) and the section 14 is a gas push-type spring (but of course these two components could be reversed). The first and second sections 12,14 are separated from each other by a dividing member 210 which is rigidly affixed to the interior of the housing member 33, and which provides a gas and fluid tight seal between the first and second sections 12,14, such as via the use of an elastomeric o-ring 211 positioned within a annular recess in the outer periphery of the dividing member 210. The dividing member 210 divides the housing 33 into a first chamber 212 (associated with the first section 12) and a second chamber 214 (associated with the second section 14), and, as discussed below, the first chamber is further divided into two sections 212A and 212B. The first portion 212A of the first chamber 212 and the second chamber 214 are filled with a pressurized gas, such as nitrogen or other suitable gas, that is pressurized to an appropriate range for the intended use. The second portion 212B of the first chamber-212 is not under pressure (i.e., at atmospheric pressure, or under significantly less pressure than portion 212A), and is preferably filled with air or other suitable gas. While the chambers 212A and 214 can be pressurized to the same level, it is also contemplated that the chambers 212A and 214 could be pressurized to different levels. In addition, the chambers 212A, 214 each preferably include a small amount of oil, or other lubricant, to facilitate the axial movement of the pistons within the chambers and the piston rods within the apertures in the various rod guide members discussed below.

The distal ends of the housing 33 are provide with end caps 216, 218 that seal the ends of the housing and also act as guides for the associated piston rods via a guide aperture provided therein. The end caps 216, 218 may each comprise a single member, or each end cap may consist of an assembly that includes multiple components, such as a generally cylindrical metal rod guide member, a washer member, and a disk-like elastomeric seal member, which are stacked on each other in the axial direction, and each of which include an aperture therein for slidably receiving the piston rod. The distal ends of the housing may each include an annular lip portion 220 for maintaining the end caps 216, 218 within the housing 33. In addition to, or as an alternative to, the lip portions, the end caps 216, 218 may be secured within the housing in any desired manner, such as via welding, adhesive, press-fit, etc.

The first section 12, which in this embodiment is a traction type gas spring, includes a piston 222 that separates a piston rod into two sections, a first, smaller diameter portion 224, and a second, larger diameter portion 226. The piston 222, which is rigidly affixed to the rod 224/226, includes one or more small apertures to allow the gas within the chamber 212 to flow, in a restricted manner, from one side of the piston 222 to the other side of the piston as the rod 224/226 is moved in the axial direction. Preferably, the piston 222 includes an elastomeric o-ring 228 seated within a recess on the outer circumference of the piston 222.

The first section 12 also includes an interior rod guide assembly 230 that is configured and arranged to guide the larger diameter rod portion 226, and to seal between the two portions of the chamber 212, which are designated as chamber portions 212A and 212B. For example, in certain embodiments, the interior rod guide assembly 230 may include a generally cylindrical metal rod guide member, one or more washer members, and one or more disk-like elastomeric seal members. In the embodiment shown in FIG. 12, the interior rod guide assembly 230 includes a generally cylindrical metal rod guide member 232, a pair of washer members 234, and a pair of disk-like elastomeric seal member 236, with one seal member 236 being associated with each washer member 234. Each of the components of the interior rod guide assembly includes an aperture for slidably receiving the rod 226 therein. Further, in this embodiment, the washer members 234 each include an annular ridge 238 on one side thereof, which ridges are each configured to be received within a corresponding annular recess formed in the associated seal member 236. Although not shown, in other embodiments, the seal members may lack the annular recess. Further, the washer members may lack the annular ridge.

The second section 14, which in this embodiment is a push-type gas spring, includes a piston 242 that is formed on the interior end of a piston rod 244. The piston 242, which is rigidly affixed to the rod 244, includes one or more small apertures to allow the gas within the chamber 214 to flow, in a restricted manner, from one side of the piston 242 to the other side as the rod 244 is moved in the axial direction. Preferably, the piston 242 includes an elastomeric o-ring 246 seated within a recess on the outer circumference of the piston 242. The dividing member 210 also acts as end stop for stopping further leftward axial travel of the piston 242. As an enhancement of this stopping feature, a disk 248 made of metal or other rigid material may be provided on the contact surface of the dividing member 210. The disk 248 may be inset into an elastomeric member 252 that is attached to a flat washer 254 that abuts against the dividing member 210.

As can be seen in FIG. 12, the housing member 33 is provided with a plurality of inwardly facing annular protrusions 252A, 252B, 252C and 252D. Annular protrusion 252A acts as a stop to prevent the piston 222 of the first section 12 from moving to far in the leftward direction, and annular protrusion 252D acts as a stop to prevent the piston 242 of the second section 14 from moving too far in the rightward direction. Additionally, annular protrusion 252B helps to maintain interior rod guide assembly 230 in position when acted upon by piston 222 (i.e., protrusion 252B keeps assembly 230 from being pushed in the rightward direction), and annular protrusion 252C helps to maintain the dividing member 210 in position when acted upon by piston 242 (i.e., protrusion 252C keeps dividing member 210 from being pushed in the leftward direction).

Figure 13:
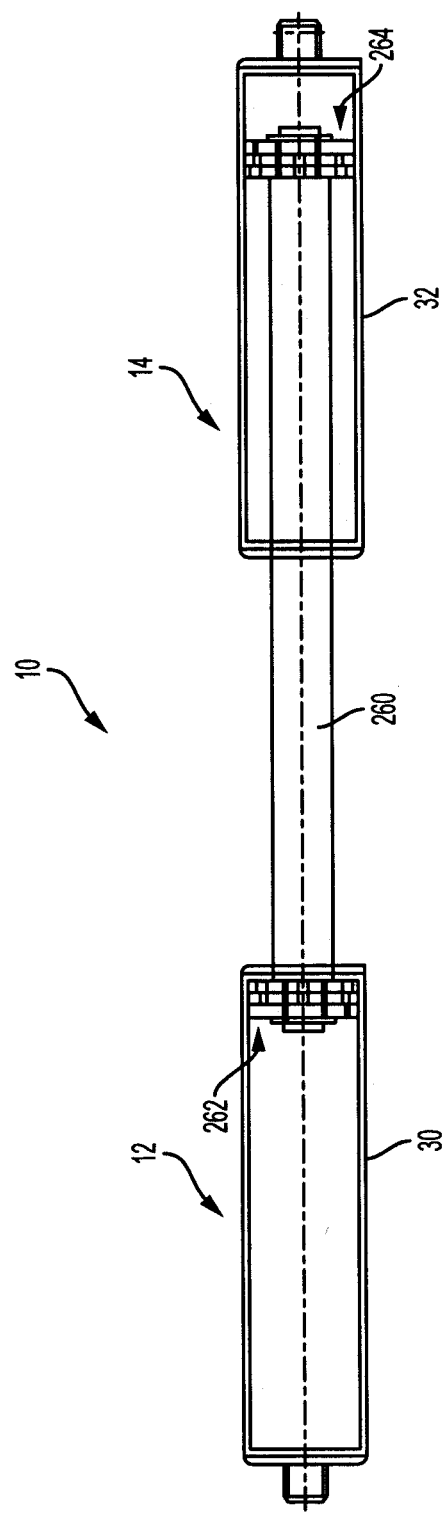
FIG. 13 is a schematic cutaway view of yet another embodiment of the present steering assist member, wherein this embodiment includes a single piston rod extending through both the first and second sections.

Turning now to FIG. 13, a cutaway view of another embodiment of the present centering stabilizer/steering assist member 10 is shown and will be discussed. One of the main features of this embodiment is that there is a single piston rod 260 utilized by both the first section 12 and the second section 14. In this embodiment, the first section 12 is a push-type gas spring and the second section 14 is a gas traction spring (i.e., a gas pull-type spring), but of course these two components could be reversed. If desired, an additional covering member (not shown) may be provided over the entire centering stabilizer/steering assist member 10 of FIG. 13.

As can be seen in FIG. 13, the first section 12 includes a first cover 30 within which is provided a pressurized gas, such as nitrogen, and a small amount of lubricant, as with the other embodiments. This first section 12 includes a first piston 262 attached to a one end (a first end) of the single piston rod 260. This first piston 262 is configured in any desired manner, such as described with regard to the other embodiments.

As can also be seen in FIG. 13, the second section 14 includes a second cover 32 within which is provided a pressurized gas, such as nitrogen, and a small amount of lubricant, as with the other embodiments. This second section 14 includes a second piston 264 attached to the other end (a second end) of the single piston rod 260. This second piston 264 is configured in any desired manner, such as described with regard to the other embodiments.

In this embodiment of FIG. 13, as with all of the other embodiments, the specific structures of the first and second sections 12, 14 may be configured as described in any of the disclosed embodiments, or with a different configuration, as long as one of the first and second sections provides a pulling force and the other of the first and second sections provided a pushing force. Thus, for example, the relevant structures of the first and second sections of FIG. 12 could be provided in the FIG. 13 embodiment, with the primary difference being that in the FIG. 13 embodiment, the piston rods of the first and second sections are comprised of a single rod that extends between both sections.

Turning now to FIG. 14, this embodiment shows the present centering stabilizer/steering assist member 10 paired with a dynamically adjustable trim device 270, which allows for the driver to make adjustments while driving. In the embodiment shown in FIG. 14, the centering stabilizer/steering assist member 10 is configured as depicted in FIG. 13 (i.e., with a single piston rod extending through both the first and second sections 12, 14). However, it is contemplated that other configurations of centering stabilizers/steering assist members could be used with trim device 270.

In the FIG. 14 embodiment, the first section 12 is configured as a push-type gas spring, and the second section 14 is configured as a pull-type (traction) gas spring. As with the other embodiments, a first mounting means 26 is provided at one end and a second mounting means 28 is provided at the opposite end. The first mounting means 26 may be rigidly attached to the frame of an automobile, and the second mounting means 28 may be attached to the tie rod of the vehicle's steering system, as described with regard to the other embodiments. Alternative connecting configurations, including both alternative connecting means as well as alternative locations for connection, are also contemplated.

The adjustable trim device 270 includes a toggle lever 272 (or similar switching device) that is connected to a Bowden cable 274 (or other similar means for transferring a pulling force), which is also connected to an adjustable clamping assembly 276. The adjustable clamping assembly 276 extends through an aperture in the cover 32 of the second section 14 such that the toggle switch 272 can be operated to allow for the clamping assembly 276 to be in either an open position, which allows for the single piston rod 260 to slide freely within the assembly 276, or a locked position, in which the clamping assembly 276 is tightly clamped around the single piston rod 260, preventing the rod 260 from sliding within the cover 32. The adjustable clamping assembly including a biasing means (such as a coil spring), not shown, which maintains it in the locked position until the toggle switch is moved to the open position and the force of the wire within the Bowden cable counteracts the biasing force of the biasing means. The adjustable trim device 270 of FIG. 14 serves essentially the same purpose as the dynamically adjustable mount 140 of FIG. 7 (i.e., effectively adjusting the functional length of the device, which effectively changes the resulting "centering" force upon the tie rod 162 in one direction or the other to compensate for an original mis-alignment or a changed condition).

It should be noted that although the various embodiments of the devices described herein may be referred to as a steering assist member, a centering member, a centering stabilizer/steering assist member, etc., each of the devices is contemplated for use as part of a vehicle steering system, as well as for use in other environments where a centering force is desired, such as in two-way doors, gates, hatches, etc.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A centering stabilizer comprising:
   a first section configured and arranged to produce a pulling force along a longitudinal axis thereof;
   a second section configured and arranged to produce a pushing force along a longitudinal axis thereof, wherein said first section and said second section are configured and arranged such that the longitudinal axis of the first section is aligned with the longitudinal axis of the second section;
   first mounting means attached to a first distal end of the centering stabilizer, wherein said first mounting means is configured and arranged to securely attach the centering stabilizer to a first portion of a steering system of a vehicle, wherein said first portion of said vehicle steering system is configured and arranged to move in association with a set of steerable wheels; and
   second mounting means attached to a second distal end of the centering stabilizer, wherein said second mounting means is configured and arranged to securely attach said second section of said centering stabilizer to a second portion of the vehicle, wherein when the set of steerable wheels are displaced from a straight ahead driving position, a distance between the first portion of said vehicle steering system and said second portion of the vehicle changes.

2. The centering stabilizer according to claim 1, wherein:
   said second section comprises a gas push-type spring; and
   said first section comprises a gas traction spring.

3. The centering stabilizer according to claim 1, wherein:
   said second section comprises a compression coil spring; and
   said first section comprises a tension coil spring.

4. The centering stabilizer according to claim 1, wherein at least one of the first section and the second section comprises a gas spring.

5. The centering stabilizer according to claim 1, wherein the longitudinal axis of the first section and the longitudinal axis of the second section are aligned along a central axis.

6. The centering stabilizer according to claim 1, further comprising a single piston rod extending within both the first section and the second section.

7. The centering stabilizer according to claim 1, further comprising a single housing associated with both the first section and the second section.

8. The centering stabilizer according to claim 7, wherein said single housing is divided by a dividing member into a first chamber, which is associated with said first section, and a second chamber, which is associated with the second section.

9. The centering stabilizer according to claim 8, wherein:
   said first chamber is further divided into two sections, a first section that is filled with a pressurized gas and a second section that is not under pressure, and
   said second chamber is filled with a pressurized gas.

10. A system for centering and stabilizing a set of turning wheels of a vehicle, wherein the system comprises:
a steering linkage member that is configured and arranged to provide a steering motion to a set of steerable wheels; and
a steering assist member that includes one end operatively attached to a first portion of said steering linkage member and another end attached to a second portion of the vehicle, wherein when the set of steerable wheels are displaced from a straight ahead driving position, a distance between the first portion of said steering linkage member and said second portion of the vehicle changes;
wherein said steering assist member comprises:
a first section configured and arranged to produce a pulling force along a longitudinal axis thereof; and
a second section configured and arranged to produce a pushing force along a longitudinal axis thereof, wherein said first section and said second section are configured and arranged such that the longitudinal axis of the first section is aligned with the longitudinal axis of the second section.

11. The system according to claim 10, wherein:
said second section comprises a gas push-type spring; and
said first section comprises a gas traction spring.

12. The system according to claim 10, wherein:
said second section comprises a compression coil spring; and
said first section comprises a tension coil spring.

13. The system according to claim 10, wherein at least one of the first section and the second section comprises a gas spring.

14. The system according to claim 10, wherein the longitudinal axis of the first section and the longitudinal axis of the second section are aligned along a central axis.

15. The system according to claim 10, further comprising a single piston rod extending within both the first section and the second section.

16. The system according to claim 10, further comprising a single housing associated with both the first section and the second section.

17. A centering member comprising:
a first section configured and arranged to produce a pulling force along a longitudinal axis thereof;
a second section configured and arranged to produce a pushing force along a longitudinal axis thereof, wherein said first section and said second section are configured and arranged such that the longitudinal axis of the first section is aligned with the longitudinal axis of the second section;
first mounting means attached to a first distal end of the centering member; and
second mounting means attached to a second distal end of the centering member,
wherein:
said second section comprises a gas push-type spring; and
said first section comprises a gas traction spring.

18. The centering member according to claim 17 wherein the longitudinal axis of the first section and the longitudinal axis of the second section are aligned along a central axis.

19. The centering member according to claim 18, further comprising a single piston rod extending within both the first section and the second section.

20. The centering member according to claim 18, further comprising a single housing associated with both the first section and the second section.

21. A centering member comprising:
a first section configured and arranged to produce a pulling force along a longitudinal axis thereof, wherein said first section extends between two longitudinal ends that are defined as a first proximal end and a first distal end;
a second section configured and arranged to produce a pushing force along a longitudinal axis thereof, wherein said second section extends between two longitudinal ends that are defined as a second proximal end and a second distal end;
connecting means configured and arranged to connect the first proximal end to the second proximal end such that the longitudinal axis of the first section is aligned with the longitudinal axis of the second section;
first mounting means attached to the first distal end of the first section, wherein said first mounting means is configured and arranged to securely attach said first section of said centering member to a first portion of a system configured and arranged to be acted upon by a centering force; and
second mounting means attached to the second distal end of the second section, wherein said second mounting means is configured and arranged to securely attach said second section of said centering member to a second portion of the system.

22. The centering member according to claim 21, wherein:
said second section comprises a gas push-type spring; and
said first section comprises a gas traction spring.

23. The centering member according to claim 21, wherein:
said second section comprises a compression coil spring; and
said first section comprises a tension coil spring.

24. The centering member according to claim 21, wherein said connecting means comprises a male threaded portion on one of said first section and said second section and a female threaded portion on the other of said first section and said second section.

25. The centering stabilizer according to claim 1, further comprising a connecting means for connecting said first section to said second section, wherein said connecting means comprises a male threaded portion on one of said first section and said second section and a female threaded portion on the other of said first section and said second section.

26. The centering member according to claim 21, wherein the centering force created by said centering member returns components of the system to a centered position.

27. The centering member according to claim 26, wherein the centered position is dynamically adjustable.

28. A centering member comprising:
a first section configured and arranged to produce a pulling force along a longitudinal axis thereof;
a second section configured and arranged to produce a pushing force along a longitudinal axis thereof, wherein said first section and said second section are attached to each other;
first mounting means attached to a first distal end of the centering member; and
second mounting means attached to a second distal end of the centering member.

29. The centering member according to claim 28, wherein:
said first section comprises a gas traction spring; and
said second first section comprises a gas push-type spring.

30. The centering member according to claim 28, wherein:
 said first section comprises a tension coil spring; and
 said second section comprises a compression coil spring.

* * * * *